Sept. 22, 1959    A. O. JANSSON    2,904,864
FASTENER
Filed May 6, 1957
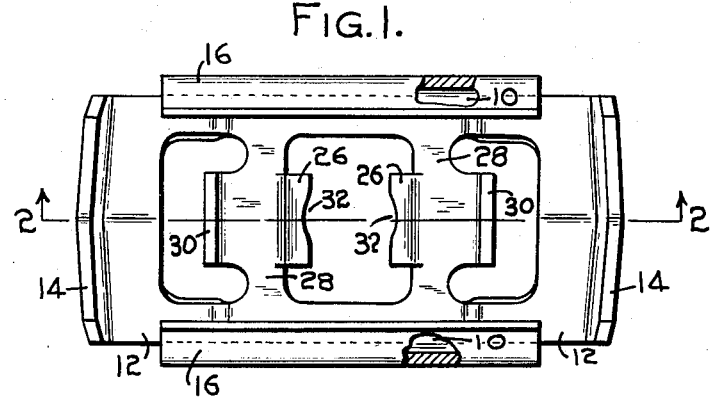
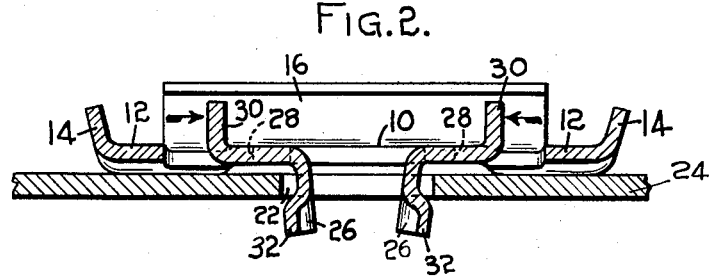
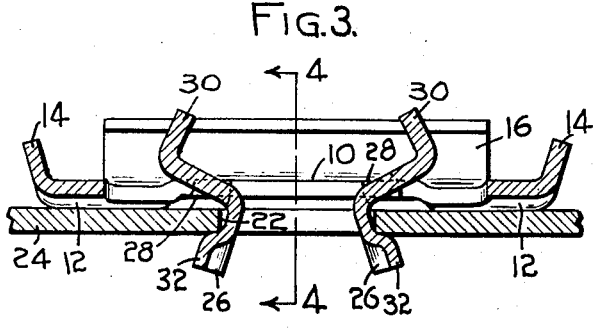  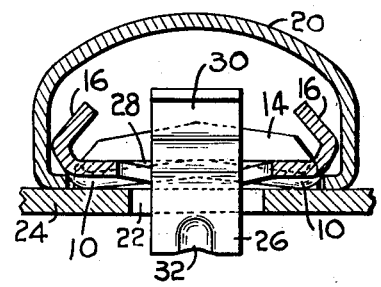
INVENTOR:
ARNOLD O. JANSSON,
BY Emery, Booth, Townsend
Miller + Widner ATTORNEYS.

United States Patent Office 2,904,864
Patented Sept. 22, 1959

2,904,864
FASTENER

Arnold O. Jansson, Arlington, Mass., assignor to United-Carr Fastener Corporation, Cambridge, Mass., a corporation of Delaware Application May 6, 1957, Serial No. 657,167

6 Claims. (Cl. 24—73)

This invention relates to a fastener element adapted for anchorage in an essentially permanent manner in a preformed hole through one or more plates or panels. Particularly when anchored to a single plate, a portion of the same which remains exposed at the front of the perforated plate may be formed to cooperate with another part to be held against the plate.

The object of the invention is to provide an element which, although easily entered into the hole and easily operated on thereafter to effect the anchorage, is very firmly and strongly anchored as a result of a deformation of certain of its parts by torsion.

In the drawing I have shown, by way of an example, an embodiment of the invention entered into a hole in a sheet metal plate and which, anchored therein, serves for mounting a sheet metal molding of channel-like form.

In the drawing:

Fig. 1 is a plan view of the fastener as such;

Fig. 2 is a section along line 2—2 of Fig. 1, showing the fastener entered into a hole in a plate, but not yet anchored;

Fig. 3 is a similar view after anchorage has been effected; and

Fig. 4 is a section on the line 4—4 of Fig. 3 but showing additionally a molding snapped onto the fastener element.

In the description the words "forwardly" and "rearwardly" are from the point of view of one standing in front of a structure and applying the fastener thereto and thus viewing the fastener as in Fig. 1, and could be translated respectively into "lower" and "upper" viewing Fig. 2. "Inner" and "outer" in most instances are used relatively with reference to the general geometrical form of the fastener as shown.

The fastener element as seen in Figs. 1 and 2 comprises a base which herein takes the form of a rectangular frame having sides 10 and ends 12. The ends herein are rigidified by integral flanges 14 and the sides 12 by integral rearwardly turned flanges 16 which first flare outwardly and then inwardly as seen in Fig. 4, and provide holding portions into engagement with which the molding 20 shown in that figure may be snapped.

The means for anchoring the base to the hole 22 through plate 24 as shown in Figs. 2–4 comprises two forwardly projecting jaw elements 26 for grappling the opposed margins of the hole. In the embodiment shown these are symmetrical duplicates and the fastener as a whole is substantially symmetrical about the vertical median in Fig. 1. The sides of the frame are spanned by integral crossbars 28 of substantial width. Between these crossbars and the ends 12 of the frame are bent up rearwardly extending ears 30, based on the middle portions of these bars, the ears being of lesser length transversely of the base than the length of the bars 28. Between the two crossbars are formed the two forwardly bent ears forming the jaws 26 above referred to, based on the opposite margins of the bars and likewise of a transverse length less than that of the bars, leaving end portions of the bars between jaws 26 and ears 30 and the side members 10 for a purpose which will appear.

The reader will probably note from Fig. 2 that the combined length of the jaws 26 is greater than the distance between the bars 28 and will inquire how they could be formed intergrally from the originally intervening body of metal. In the form of the invention illustrated this portion of the blank was severed from the sides 10 and drawn downwardly to elongate it and prepare it for the formation of the jaws 26.

The jaws 26 extend initially as seen in Fig. 2, substantially at right angles to the base and distal portions of the jaws have outwardly pressed portions 32 to contribute to their grappling engagement with the margins of the hole 22.

The fastener as shown in plan in Fig. 1 is presented to the hole which in the present instance is slightly larger than the span of the jaws 26, so that they may enter the same by a movement of axial approach to the position of Fig. 2. The fastener is now deformed to secure an anchorage and in the form illustrated this is due to a symmetrical movement of the jaws 26 away from each other to the position of Fig. 3, rather than a movement of one jaw only away from the other. The ears 30 provide means for so spreading the jaws and these ears are moved symmetrically toward one another, although in theory each might be considered as an abutment toward which the other is pressed. The ears 30 as shown in Fig. 2, may be spanned by a suitable instrument such as a pair of pliers and approximating movement of the plier jaws will press the ears toward each other, as indicated by the arrows in Fig. 2. The ears, however, are supported by the bars 28 and this motion takes place by a twisting of the side portions of these bars where they intervene between the ears and jaws on the one hand and the sides 10 of the base on the other. As a result of this twisting the ends of the jaws 26 are moved away from each other into grappling engagement with the walls of hole 22 and the parts assume the position of Fig. 3. While this deformation of the parts may be effected as suggested by hand operated pliers, it nevertheless requires a considerable force, so that the anchorage is very firm and strong. In practice, especially since the ends of the jaws 26 are ordinarily inaccessible, the mounting is effectively a permanent one.

It will be understood that, while the metal from which the fastener is formed is not soft or freely pliable, it is malleable in the sense that it may be deformed in the manner described. It does not have a hard temper which would render it brittle and the engagement and anchorage are not procured by spring action.

As indicated by Figs. 3 and 4 of the drawings, the base of the fastener may be somewhat crowned. Primarily this is to facilitate sealing of the opening in the plate by a plastic sealing compound applied at the base of the fastener. No attempt is made to show this compound in the drawings. The anchorage of the fastener may draw down the central portion of the crown of the base somewhat in the process of securing anchorage.

I am aware that the invention may be embodied in other specific forms without departing from the spirit or essential attributes thereof, and I therefore desire the present embodiment to be considered in all respects as illustrative and not restrictive, as is in fact clear in several matters from the description itself. Reference is to be had to the appended claims to indicate those principles of the invention exemplified by the particular embodiment described and which I desire to secure by Letters Patent.

I claim:

1. A fastener element for anchorage in a hole in a plate comprising a base adapted to rest on the plate and having a plate engaging element projecting from one side of the base and adapted to pass through the hole in said plate and grapple an edge thereof, the base having openings defining an intermediate flat bar in the plane of the base having a first portion extending from one edge of the bar disposed angularly to the base and adapted to enter the hole in said plate and be disposed opposite the said engaging element and a second portion extending from the opposite edge of the bar, and an abutment on said base opposite said second portion to provide means for exerting pressure between the abutment and said second portion to twist the bar and project the first portion thereof into grappling engagement with an edge of the hole.

2. A fastener element as set forth in claim 1 wherein the base has projecting stiffening parts.

3. A fastener element for anchorage in a hole in a plate comprising a base adapted to rest on the plate, said base having spaced openings therethrough defining two intermediate flat cross bars having effectively integral projections of lesser width than the length of the bars extending inwardly and outwardly therefrom, said inwardly extending projections being adapted to enter the hole in said plate, said outwardly extending projections providing levers by which the cross bars may be twisted to move the first named extensions into grappling engagement with the margins of the hole.

4. A fastener element for anchorage in a hole in a plate comprising a base in the form of an open centered frame adapted to rest on the plate, a pair of flat cross bars each rigidly secured to opposite sides of said base and having projections rigidly secured to and extending inwardly and outwardly therefrom, whereby the inwardly extending projections may be entered in the hole and the outwardly extending projections operated as levers for twisting the end portions of the cross bars and forcing said inwardly extending projections into grappling engagement with the margins of the hole.

5. A fastener as set forth in claim 4 wherein the margins of a pair of opposite sides of the frame are turned rearwardly to provide for engagement with a cooperating part.

6. A fastener as set forth in claim 4 wherein margins of the sides of the frame parallel to said bars are turned over as flanges to rigidify the support for the bars.

References Cited in the file of this patent

UNITED STATES PATENTS 2,612,245    Poupitch _____ Sept. 30, 1952